Dec. 11, 1945.  A. H. KING  2,390,886
MULTIPLE MAGNETO DRIVE
Filed May 10, 1944
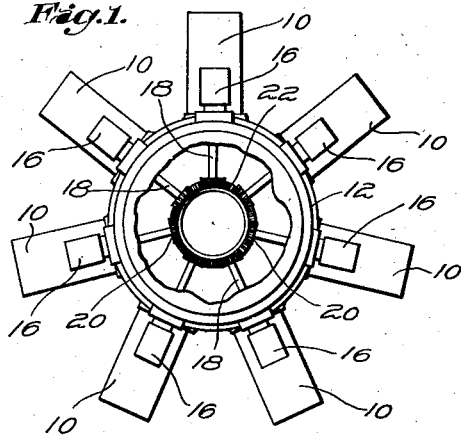
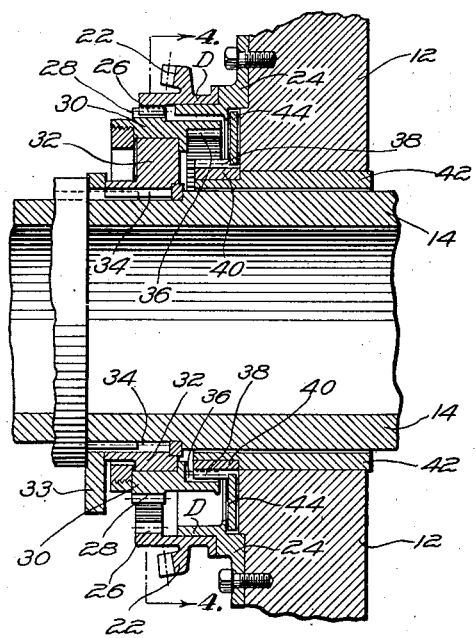
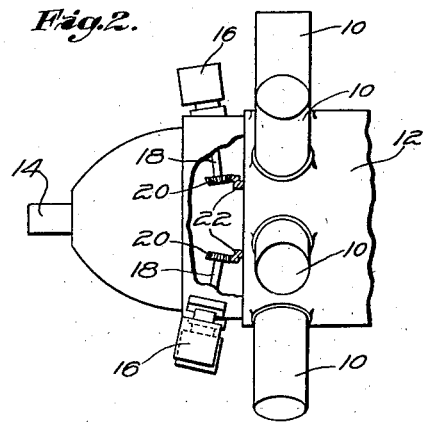
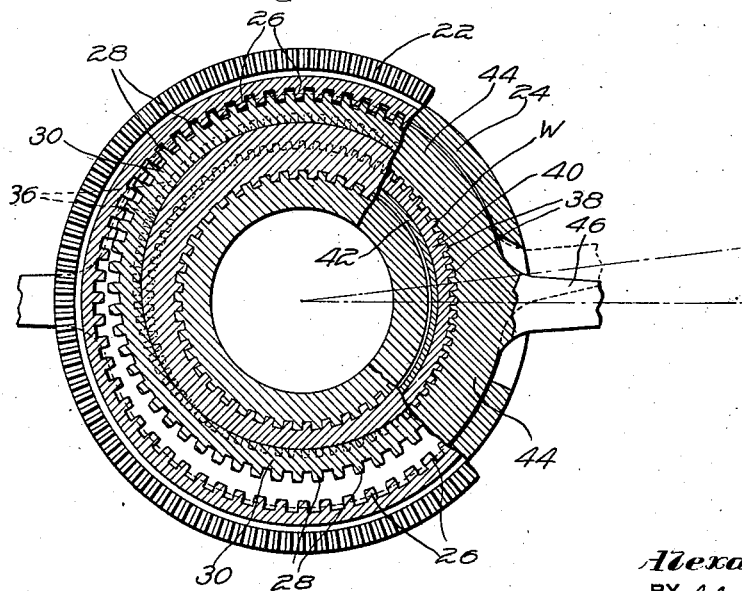
INVENTOR
Alexander H. King
BY Charles L. Shelton
Attorney Patented Dec. 11, 1945

2,390,886

UNITED STATES PATENT OFFICE 2,390,886

MULTIPLE MAGNETO DRIVE

Alexander H. King, West Hartford, Conn., assignor to United Aircraft Corporation, East Hartford, Conn., a corporation of Delaware Application May 10, 1944, Serial No. 534,896

6 Claims. (Cl. 123—149)

This invention pertains to the control of spark timing on internal combustion engines.

This invention may be used on a wide variety of engine types, but is particularly adapted for radial engines, and an object of the invention is to provide a simple and compact gear mechanism for driving a row of three or more circumferentially spaced magnetos on an engine of that type.

Another object is to provide means while the engine is in operation, for simultaneously and similarly adjusting the spark timing of all the magnetos on an engine.

More specifically, an object is to provide a train of gears for driving a number of magnetos from the crankshaft of a radial engine, together with means for simultaneously changing the angular positions of all the magneto drive gears with reference to the engine crankshaft.

Other objects and advantages will be apparent from the specification and claims, which describe what is now considered to be a preferred embodiment of the invention.

In the drawing,

Fig. 1 is a schematic front view of a seven cylinder radial engine with seven magnetos, the nose of the engine crankcase being broken away to show the magneto drive gearing.

Fig. 2 is a side view of Fig. 1 with the crankcase broken away to show another view of the magneto drive gearing.

Fig. 3 is an enlarged sectional side view showing the magneto drive gearing in detail.

Fig. 4 is a view on the line 4—4 of Fig. 3, broken away to show the timing adjusting means.

The engine has seven cylinders 10 radially mounted on crankcase 12 and driving a crankshaft 14. There are seven magnetos 16 also radially mounted on crankcase 12 and each having a shaft 18 rotated by a bevel gear 22 which rotates on a supporting ring 24 attached to the crankcase.

Gear 22 is provided with internal gear teeth 26 engaging some of the gear teeth 28 on a ring gear 30 which is of less diameter than gear 22 and is supported for rotation on an eccentric 32 splined to shaft 14 at 34. Eccentric 32 is counterbalanced by a weight 33, also splined to the shaft.

Ring 30, in turn, has internal gear teeth 36 engaging some of the teeth 38 on gear ring 40 which is co-axial with shaft 14, of less diameter than ring 30, and supported for rotation on a bearing ring 42. Closely surrounding gear 40 is a ring 44 having internal teeth engaging the teeth of gear 40 and preventing rotation of gear 40 except within certain limits. Rotation within these limits is effected by adjustment of ring 44.

Due to the spline 34, eccentric 32 is rotated by shaft 14. Rotation of eccentric 32 causes teeth 28 on ring gear 30 to mesh successively with internal gear teeth 26 on gear 22. Also, internal gear teeth 36 on ring gear 30 will be caused to mesh successively with teeth 38 on gear 40. Due to the fact that teeth 26 and 28 are unequal in number and teeth 36 and 38 are unequal in number, gear 22 will be rotated.

Ring 44 is provided with radially projecting arms, one of which is partially shown at 46. By moving or adjusting arm 46 angularly, for instance to the position shown in dotted lines in the drawing, all the magnetos in the circumferential row as shown in Figs. 1 and 2 may be simultaneously and similarly timed, because rotation of gear 40 results in a change in the angular relationship between gear 22 and shaft 14.

Certain of the details or elements of the gearing forming a part of the combination described herein are shown in the Regan patent, No. 546,249.

A mechanism for hydraulically adjusting arm 46 to provide several different timing positions is disclosed and claimed in the copending application of Axel L. Highberg, Serial No. 469,929, filed December 23, 1942, and assigned to applicant's assignee.

It is to be understood that the invention is not limited to the specific embodiment herein illustrated and described, but may be used in other ways without departure from its spirit as defined by the following claims.

I claim:

1. In combination with three or more fixed magnetos arranged in a circumferential row around an engine crankshaft, a magneto drive shaft extending radially inward from each said magneto toward the crankshaft axis, a gear train drivingly connecting each of said magneto drive shafts with said crankshaft for simultaneously and positively driving all said magneto shafts at a predetermined speed relative to the speed of said crankshaft, and means for simultaneously and similarly changing the angular position of each of said magneto shafts with respect to said crankshaft.

2. In a radial aircraft engine having at least one circumferential row of radially disposed cylinders circumferentially spaced around an engine crankshaft, a plurality of magnetos arranged around said crankshaft and associated respectively one with each of the cylinders in said row, and means for driving said magnetos by said crankshaft comprising, an annular gear surrounding said crankshaft and having a separate driving connection with each of said magnetos, a fixed gear, means for adjusting said fixed gear, and a reduction gear drive including a gear carried by said crankshaft and meshing with both said annular gear and said fixed gear.

3. In a radial aircraft engine, a crankshaft, a plurality of magnetos annularly arranged around the axis of said crankshaft, an annular gear surrounding said crankshaft, a radially disposed shaft drivingly connecting each said magneto and said annular gear, and means for driving and adjusting said annular gear with respect to said crankshaft comprising a ring gear within and meshing with said annular gear and a normally fixed gear within and meshing with said ring gear, said normally fixed gear having adjusting means thereon, and means for driving said ring gear by said crankshaft.

4. A drive and timing mechanism for a plurality of annularly arranged magnetos comprising, a plurality of radially directed magneto shafts for driving each of said magnetos, an annular gear drivingly connected with each of said magneto shafts, a driving shaft, and means for simultaneously and positively driving and adjusting said magneto shafts comprising, a gear eccentrically mounted on said driving shaft and meshing with said annular gear, a normally fixed adjustable gear meshing with said eccentrically mounted gear, and means for adjusting said normally fixed gear.

5. In a radial aircraft engine having at least one circumferential row of radially disposed cylinders circumferentially spaced around an engine crankshaft, a plurality of magnetos arranged around said crankshaft and associated respectively one with each of the cylinders in said row, a drive shaft for each of said magnetos, a gear train drivingly connecting each of said magneto drive shafts with said crankshaft for simultaneously and positively driving all said magneto shafts at a predetermined speed relative to the speed of said crankshaft, and means for simultaneously and similarly changing the angular position of each of said magneto shafts with respect to said crankshaft.

6. The combination of claim 5 in which said means for changing the angular position of said magneto drive shafts includes a fixed gear and means for adjusting said fixed gear.

ALEXANDER H. KING.